Aug. 18, 1970      A. O. CONNELL      3,524,510
GRAVE DIGGING AND FILLING APPARATUS AND METHOD
Filed Nov. 9, 1967      9 Sheets-Sheet 5
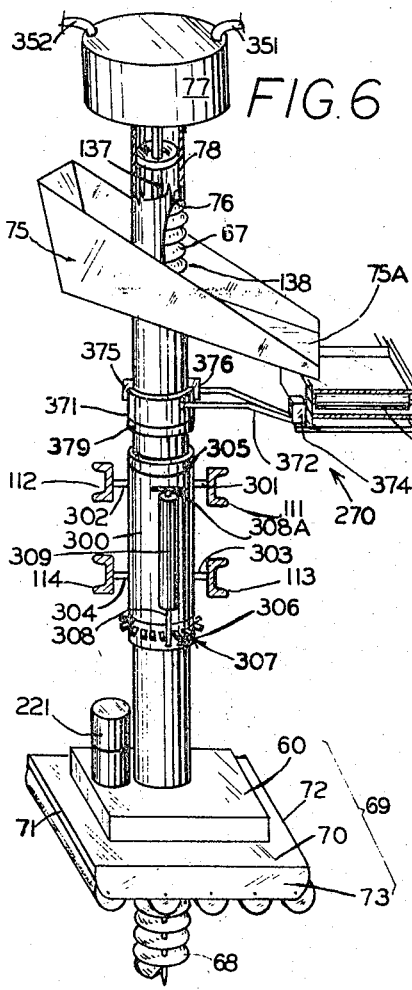
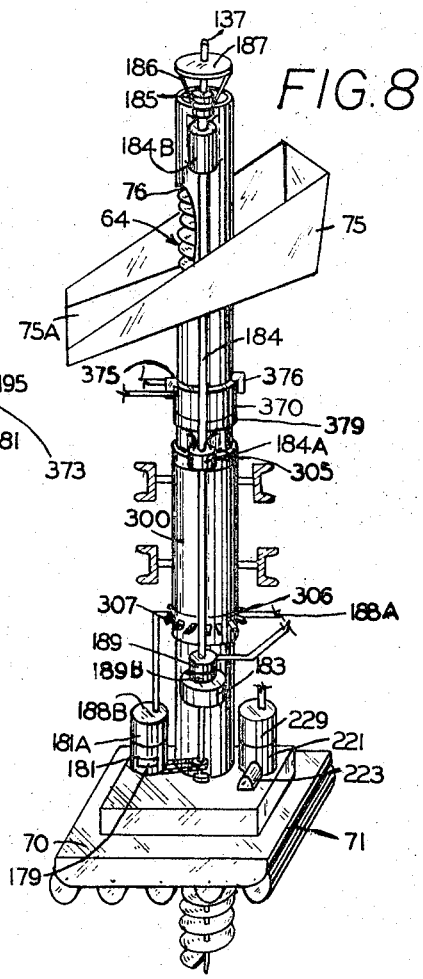
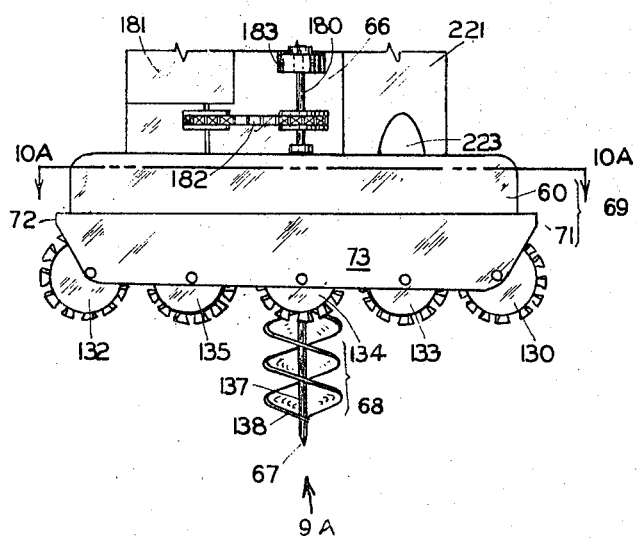
INVENTOR.
ANDREW O. CONNELL
BY
Ely Silverman
ATTORNEY Aug. 18, 1970        A. O. CONNELL        3,524,510
GRAVE DIGGING AND FILLING APPARATUS AND METHOD
Filed Nov. 9, 1967        9 Sheets-Sheet 4
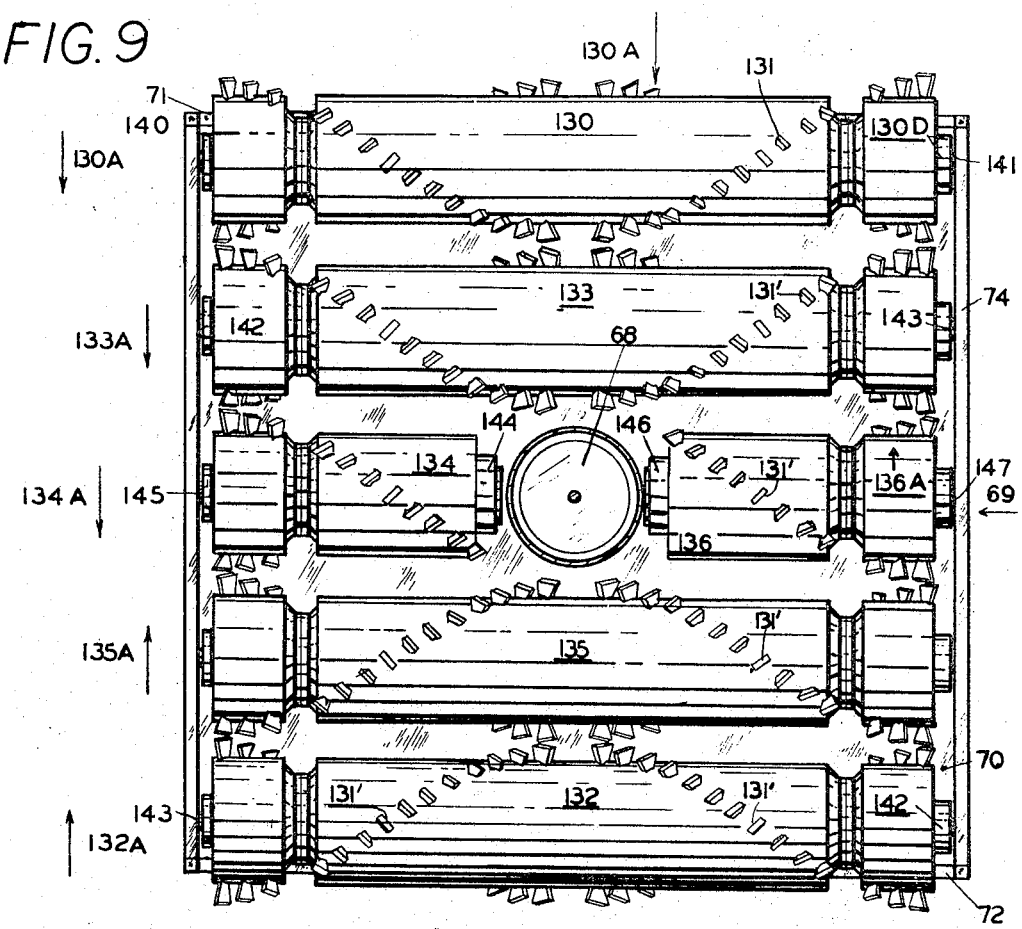
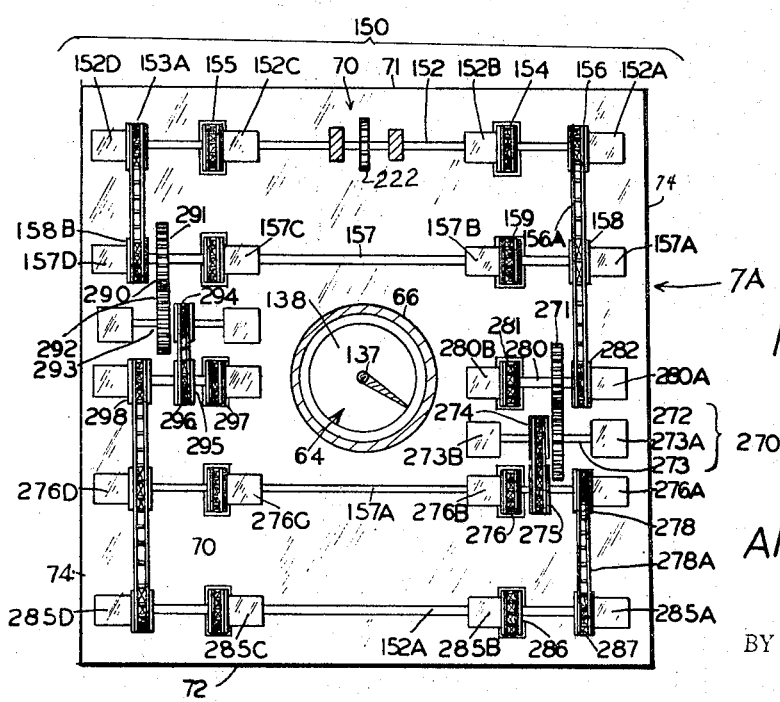
ANDREW O. CONNELL
INVENTOR.
BY
*Ely Silverman*
ATTORNEY

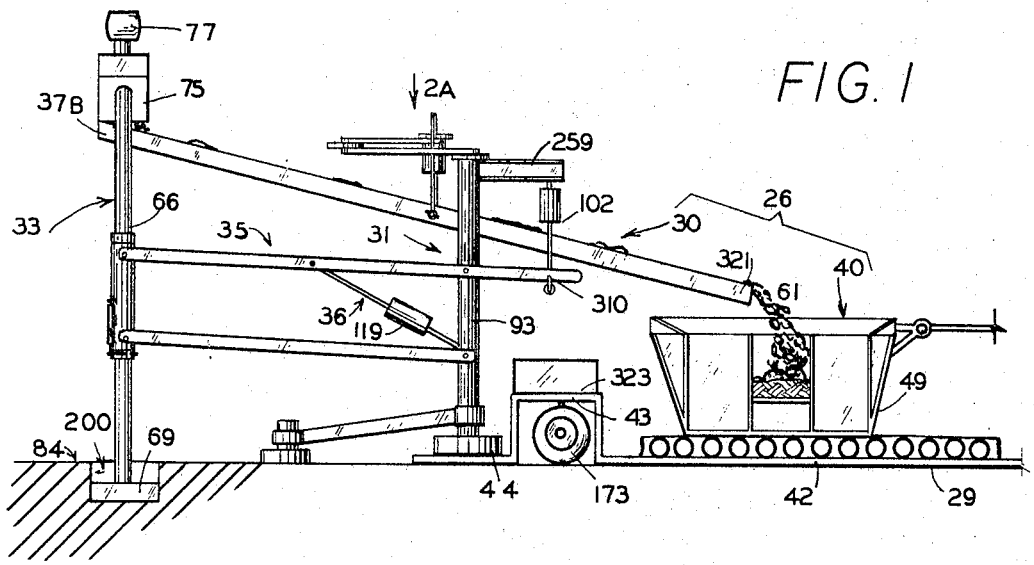
FIG. 1
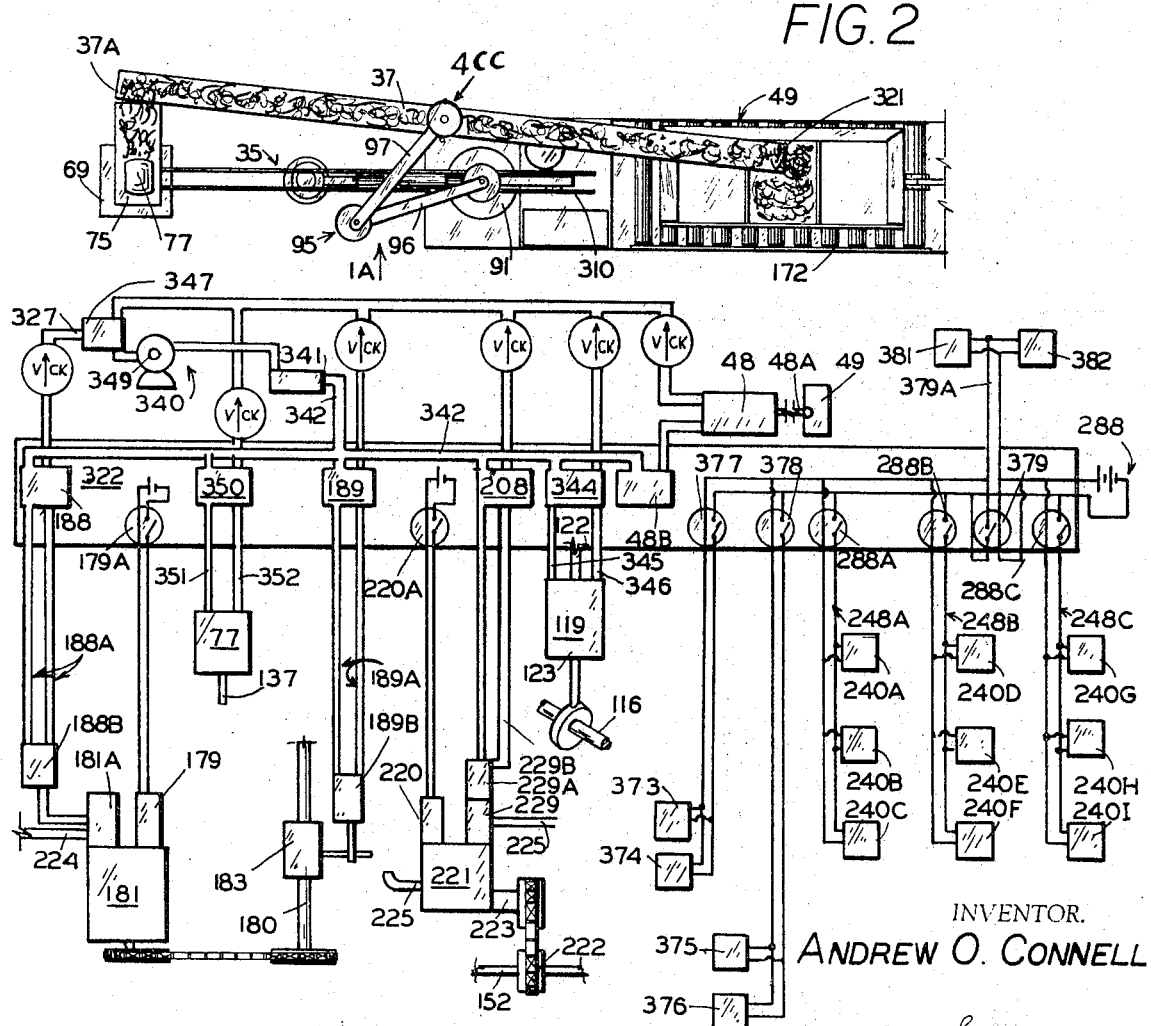
FIG. 2
FIG. 3
INVENTOR.
ANDREW O. CONNELL
By Ely Silverman
ATTORNEY

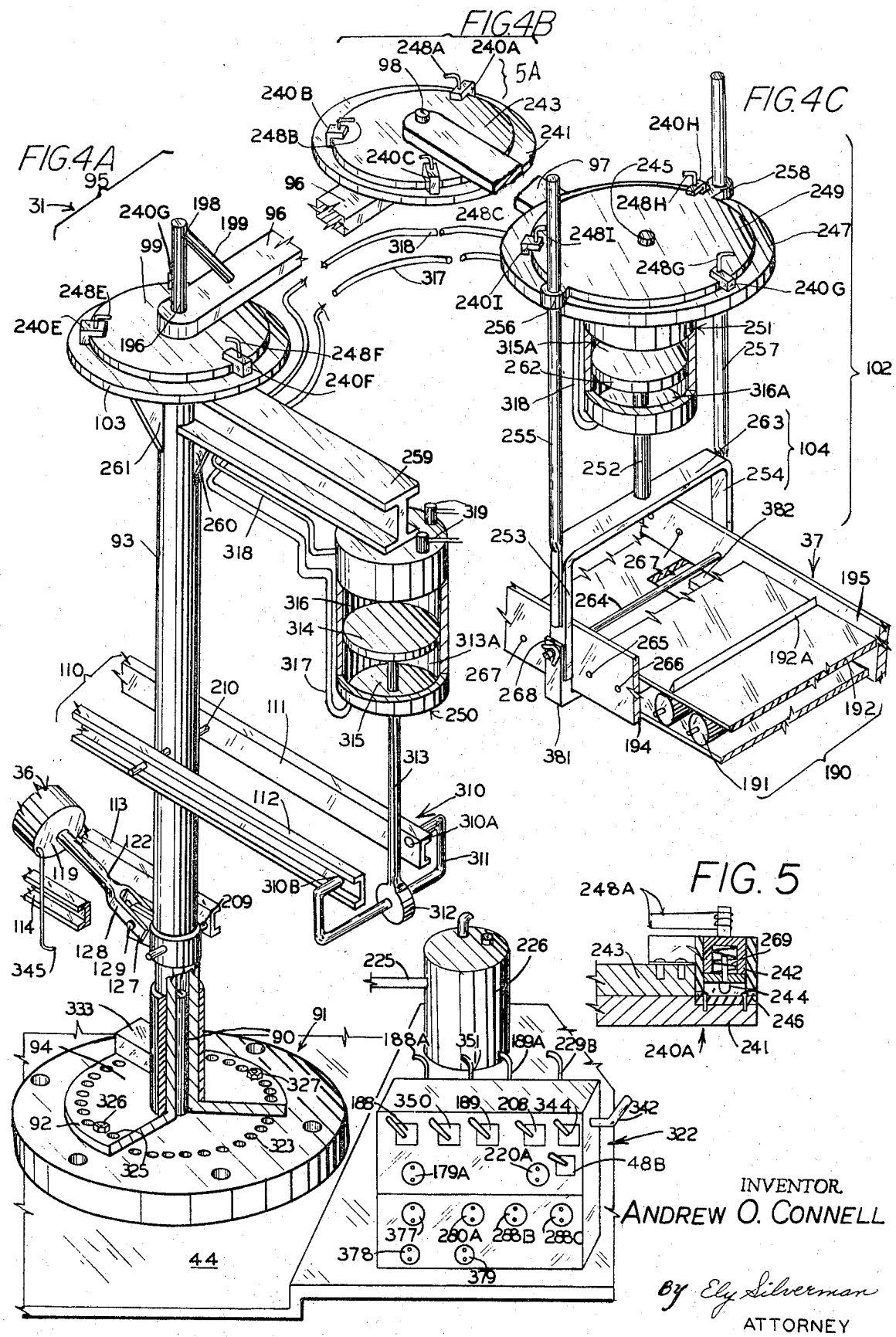

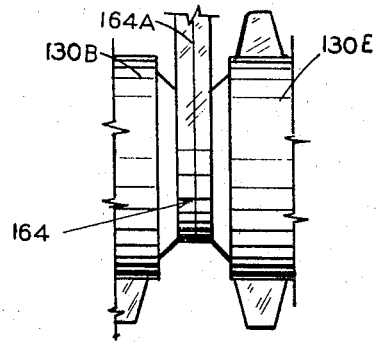
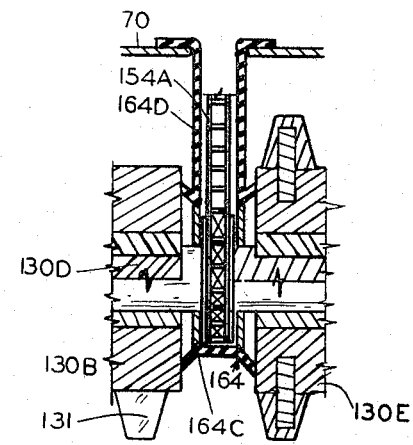
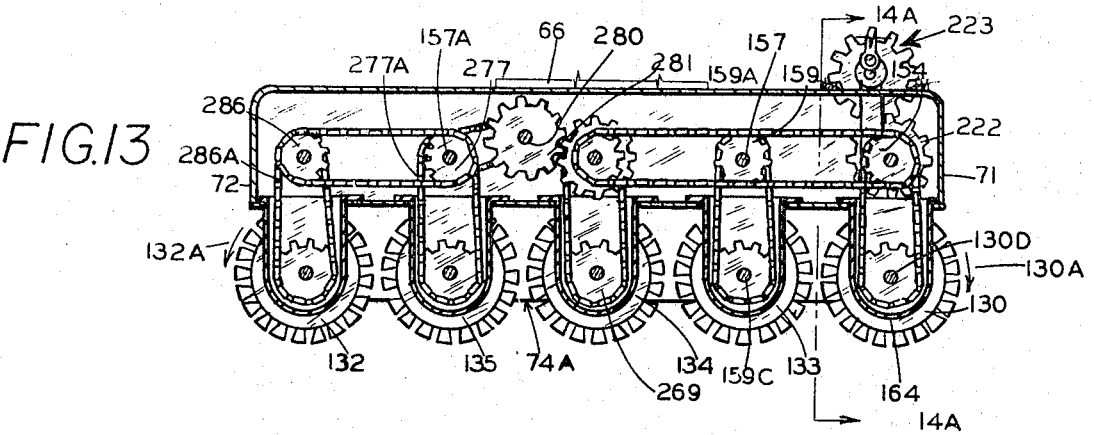
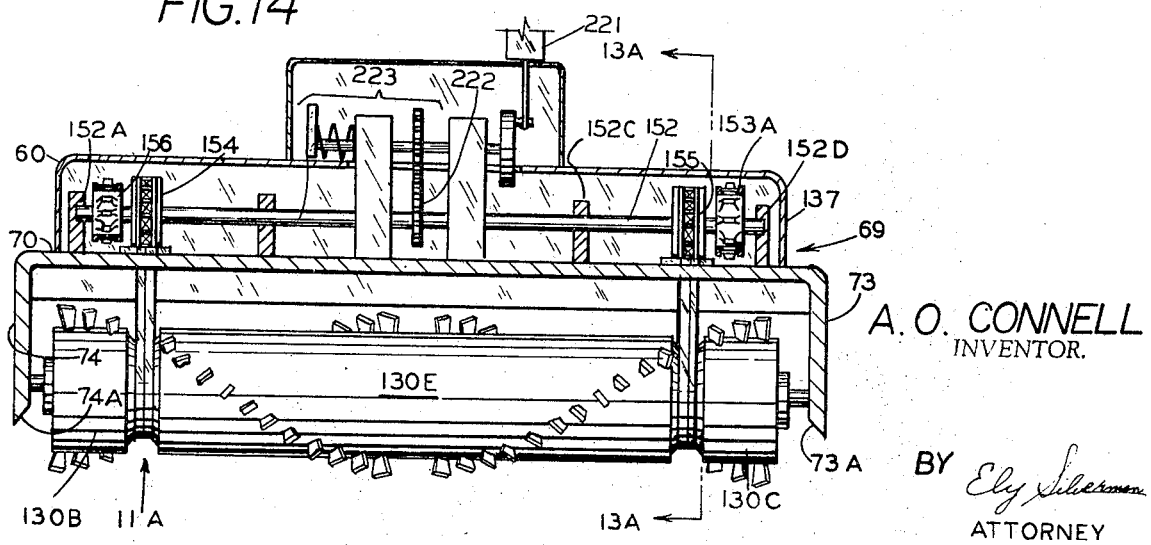

Aug. 18, 1970  A. O. CONNELL  3,524,510

GRAVE DIGGING AND FILLING APPARATUS AND METHOD

Filed Nov. 9, 1967  9 Sheets-Sheet 6

INVENTOR.
ANDREW O. CONNELL
BY
Ely Silverman
ATTORNEY

Aug. 18, 1970    A. O. CONNELL    3,524,510
GRAVE DIGGING AND FILLING APPARATUS AND METHOD
Filed Nov. 9, 1967    9 Sheets-Sheet 8

INVENTOR.
ANDREW O. CONNELL
BY
Ely Silverman
ATTORNEY

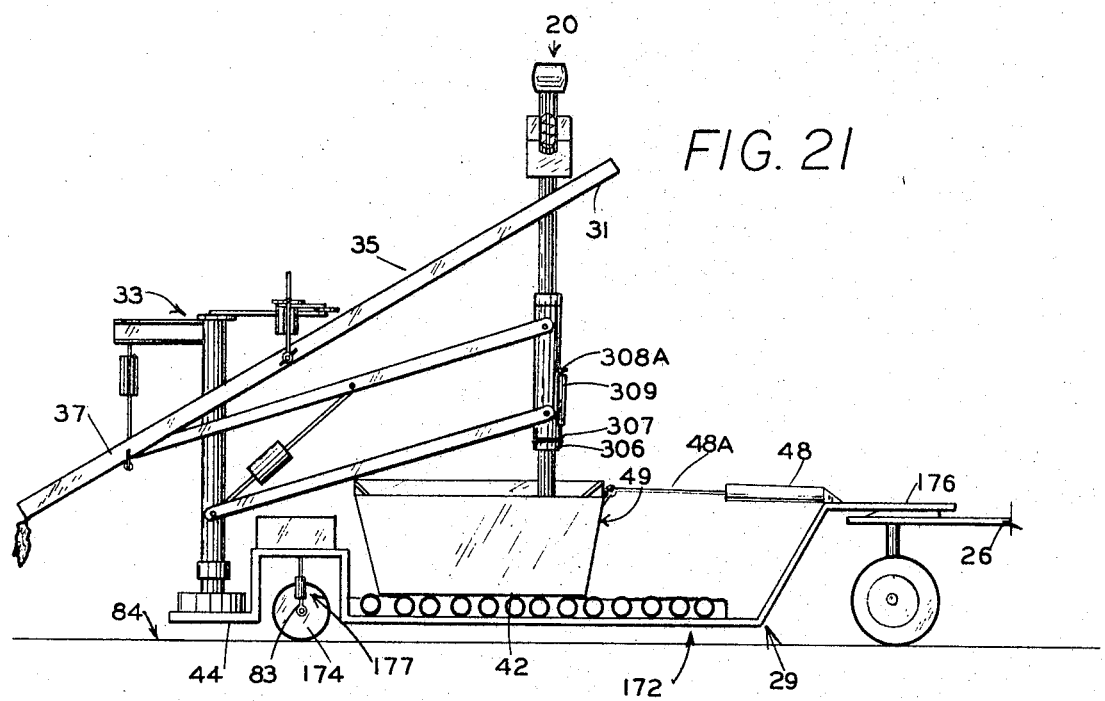
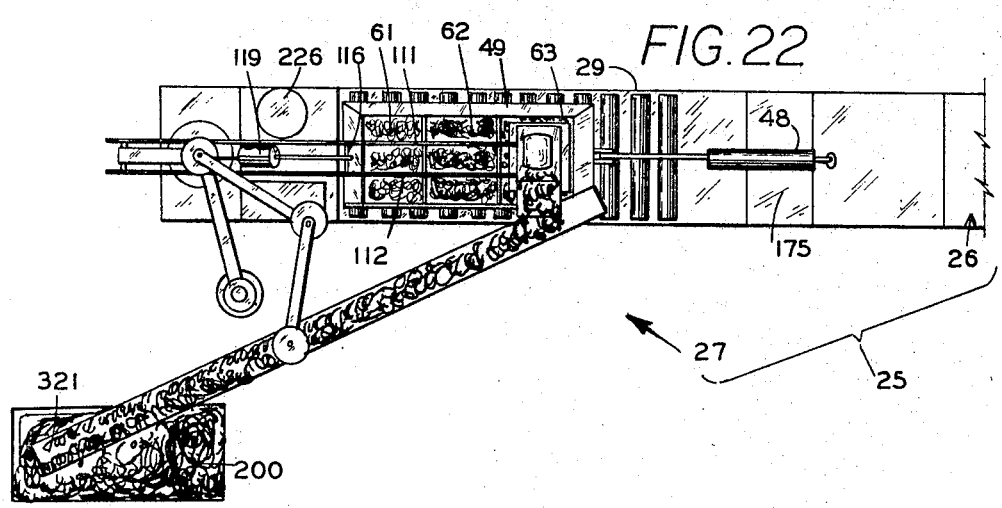

United States Patent Office 3,524,510
Patented Aug. 18, 1970

3,524,510
GRAVE DIGGING AND FILLING
APPARATUS AND METHOD
Andrew O. Connell, Stead, N. Mex. 88438
Filed Nov. 9, 1967, Ser. No. 681,784
Int. Cl. E02f 3/06, 5/20
U.S. Cl. 175—88
2 Claims

ABSTRACT OF THE DISCLOSURE

A grave-digging assembly comprising a vertical auger and a group of horizontal toothed rollers near the bottom thereof cooperate to smoothly excavate a straight sided rectangular hole. The digging assembly position is adjustably located by a support assembly and is provided with a conveyor and earth storage assembly whereby to receive and store earth excavated thereby. The discharge assembly and the conveyor may also be arrayed relative to the earth storage assembly to return the excavated earth to the finished grave to close it.

BACKGROUND OF THE INVENTION (1) The field of this invention is an apparatus and method for digging and filling graves called opening and closing graves.

(2) The description of the prior art may be summarized by that the digging of a grave requires that adjacent graves not be disturbed, i.e., that there be an absence of forceful vibration that might physically disturb the adjacent headstones as well as graves. For mechanical as well as other reasons, such as human emotions of the spectators to such operation, grave opening and closing has conventionally been performed by hand inasmuch as the usual ditch digging machines attempted to be used for this type of apparatus have proved unsatisfactory due to their vibration and inability of such apparatus to be conveniently moved to grave locations, and none of the prior art apparatuses provide for a nonobjectionable location nor a neat and rapid disposition of the earth initially excavated from the open grave yet subsequently occupied by the casket placed therein on closing of such grave.

SUMMARY OF THE INVENTION

This grave digging apparatus comprises a combination of vertical auger, a horizontal frame above the lower level of the auger supporting driven toothed rollers, the rollers cooperating with the auger to hold each other in place and to provide a smooth digging operation. An auger tube above the frame cooperates with the auger to carry the discharge of the auger to a conveyor assembly, and the conveyor assembly carries the discharged earth to an earth storage bin which is portable with, and held in varied operable relationships to the digging assembly; thereby no earth is spilt nor also wasted and a smooth digging operation as well as a clean and complete return of the earth needed to fill the grave as well as the top soil removed from the top of the grave are effected. This is a quiet, clean, and efficient apparatus in operation.

The earth not needed in the completed grave is not located even temporarily on an adjacent grave, as might be objectionable to those attending graveside religious services and adjacent graves are not physically disturbed by the smooth operation of smoothly rotating elements.

One object of the invention is to provide an improved apparatus for opening graves in a cemetery.

Another object of this invention is to provide an improved apparatus for returning earth to a grave and disposal of unused earth in closing and opening a grave.

Another object is to provide an improved method of opening and closing a grave.

BRIEF DESCRIPTION OF THE DRAWINGS

FIG. 1 is a diagrammatic side view, partly broken away, of the apparatus of the invention while operative in an initial stage of digging, as seen along direction of arrow 1A of FIG. 2. FIG. 2 is a top view thereof along direction of 2A of FIG. 1.

FIG. 3 is a diagrammatic showing of connections of the power and control system 39 of the apparatus 20.

FIGS. 4A, 4B and 4C form a group of enlarged perspective views (with intermediate beam portions deleted), shown to be same scale, of details of the tower assembly elements shown in zones 4AA, 4BB of FIG. 15 and zone 4CC of FIG. 2.

FIG. 5 is an enlarged vertical sectional view at zone 5A of FIG. 4.

FIG. 6 is a diagrammatic perspective view of the auger assembly 33 using a hydraulic drive unit.

FIG. 7 is a side view of the auger plate unit, along direction of arrow 7A of FIG. 10, and adjacent parts of apparatus shown in FIG. 8.

FIG. 8 is a diagrammatic perspective view of auger assembly according to this invention using a gasoline engine 181 for powering the auger.

FIG. 10 is a plan view, partly broken away and partly in section, along plane 10A—10A of FIG. 7 showing the toothed roller drive unit elements.

FIG. 9 is an enlarged bottom plan view of the auger unit, along the direction of arrow 9A of FIG. 7, showing tdhe overall arrangement of the rollers.

FIG. 11 is an enlarged view of the zone 11A of FIG. 14.

FIG. 12 is a partially broken away vertical sectional view of zone 11A of elements shown in FIG. 11, to the same scale as in FIG. 11.

FIG. 13 is a vertical sectional view along plane 13A—13A of FIG. 14 showing details of the toothed roller's drive structure.

FIG. 14 is a vertical sectional view along the vertical plane 14A—14A of FIG. 13 showing some detail of the drive and support means of the toothed rollers in the auger plate assembly.

FIGS. 1, 15 and 16 show a series of side views partly in section of the apparatus of FIG. 1 during a series of downwardly moving stages of its auger subassembly; FIGS. 15 and 16 are views of the assembly shown in FIG. 1 in successively more advanced digging stages than shown in FIG. 1 while digging at or opening a first longitudinal portion of a grave.

FIG. 21 is a side view of the apparatus shown in FIG. 1 when that apparatus is in its transportable condition.

FIG. 22 is a top view taken generally as FIG. 20, when the discharge of the apparatus generally arranged as in FIG. 19 is used to fill a grave located at the side of the trailer apparatus frame rather than in line therewith.

DESCRIPTION OF THE PREFERRED EMBODIMENTS

Figure 15:
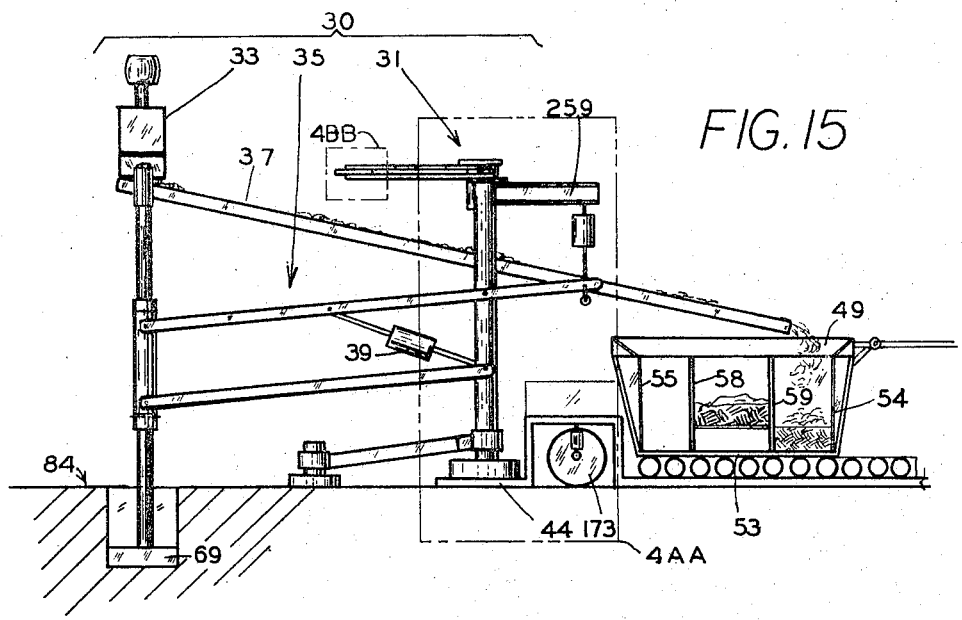

The apparatus 25 of this invention comprises a trailer 26 and a tractor 27. Trailer 26 comprises a trailer frame assembly 29, a digging assembly 30 and a receptacle subassembly 40. The trailer frame assembly 29 comprises a rigid sturdy longitudinally extending frame 172, right rear wheel 173, left rear wheel 174. The front end 175 of the trailer frame is pivotally joined in conventional manner by a conventional fifth wheel 176 to the rear of a conventional tractor 27.

The frame 172 comprises a rigid forward longitudinally extending flat forward bed portion 42, a wheel hump 43 (over the wheels 173 and 174) behind portion 42 and firmly attached to the rear end thereof and a rearwardly extending deck 44 firmly attached to the rear of portion 43; the bottoms of the deck portions 42 and 44 are coplanar and horizontal.

Hump 43 comprises an elevated hump deck 80, a rigid forward hump wall 81 and a rigid rear hump wall 82. Wall 81 is joined firmly to front of deck 80 and rear of deck 42; wall 82 is firmly joined to rear of deck 80 and front of deck 44.

The bottom of deck 80 is rigidly and firmly attached to the top of a wheel lift assembly 177. The bottom of assembly 177 is firmly attached to journals as 83 for axle of wheels 173 and 174. Assembly 177 comprises a pair of like piston chambers as 85 each attached by piston shaft as 87 to journal as 83. The piston chambers are braced by rigid attachments to walls 82 and 81, the hump 43 is thus operatively joined by a wheel lift means 177 to the axles of the wheels as 173 and 174. Thereby, in the extended position of the assembly 177, shown in FIG. 21, the frame 172 is supported with its bottom off the ground 84 while, in the contracted position of the wheel lift assembly, the bottom of deck portions 42 and 44 of the frame 172 rest on the ground as shown in FIGS. 1, 15, 16 and 17.

The digging assembly 30 comprises a tower subassembly 31, an auger subassembly 33, a link subassembly 35, a conveyor subassembly 37, and a hydraulic power and control subassembly 39. Subassembly 30 is supported on the rear deck 44 of the carrier frame 172.

The receptacle subassembly 40 comprises a compartmentalized carrier 49 and a control means 48 therefor operatively connected and located movably on the front deck 42 of the frame 172.

The carrier 49 is a compartmentalized vehicle. The carrier 49 comprises a bootom wall 53, a front wall 54, a rear wall 55, a right wall 56 and a left wall 57.

A plurality of like vertical walls 58 and 59 extend upward from the bottom wall 53 along sidewalls 56 and 57 and divide the volume of the carrier 49 into a plurality of longitudinally separated adjacent compartments as 61, 62 and 63. These separate compartments serve to receive and store different types of earth removed from the site of the grave stored therein and returned to the site of the filled in grave on closing of the grave.

The horizontal cross-sectional area of each of the compartments 61, 62 and 63 are square and equal in size for the entire depth thereof, and slightly larger than the outside size of the top plate 70 of the auger assembly 33, thereby the auger cover assembly 69 fits into and removes earth from each such compartment (61, 62 and 63) smoothly and without accumulation of the earth stored in any such compartment on top of plate 70.

Figure 17:
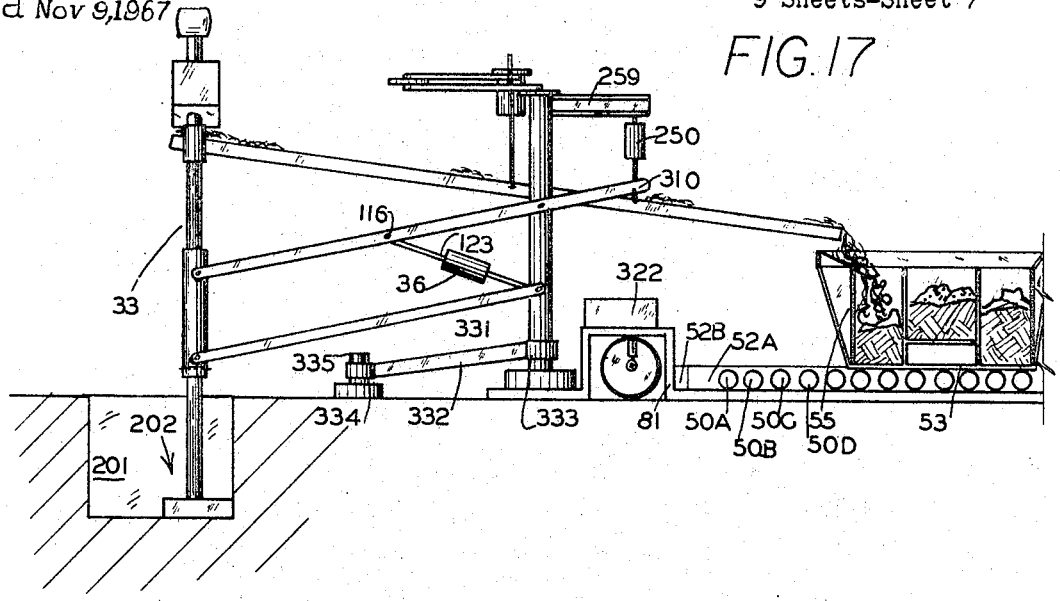
FIG. 17 shows the apparatus of FIG. 1 in a stage similar to that shown in FIG. 16 following the completion of digging a second longitudinal portion of the grave 200.

The bottom wall 53 is supported by a plurality of like sized parallel solid cylindrical rollers as 50A, 50B, 50C, 50D, and 50E that are rotatably supported on the front deck 42 of frame 172 whereby the compartments formed in the carrier 49 may be moved from the rear portion of the front deck 42 as shown in FIG. 15 to the forward portion thereof as shown in FIG. 17. The roller's ends are located in longitudinally extending rigid guides 51A, 52A, the guides maintain the spacing between the rollers. The roller guides 51A and 52A are slidably located in guide brackets as 52B and 52BB on the forward deck 42 of frame 172.

The digging auger assembly 33 comprises a rigid vertical auger tube 66, an auger 67, an auger cover subassembly 69, a discharge chute 75 and a motor 77, operatively connected. The rigid vertical tube 66 is a vertical hollow steel right cylinder open at its top for connection of auger shaft 137 therethrough to drive means therefor, (motor 180 or 77) and open at its bottom to the interior of the auger cover subassembly 69, and has a side opening 76 near its top for discharge of material therethrough onto the chute 75.

An auger 67 is rotatably held and located as below described within the tube 66. The auger 67 comprises a central shaft 137 and a spiral auger 138 therearound. A part, 68, of the auger extends below the bottom end of tube 66 and assembly 69; another part, 138, continues upward within the tube 66, the shaft 137 is also coaxial with the central longitudinal axis of the tube 66.

A square auger shield assembly 69 is firmly attached to the bottom of the tube 66. The auger shield assembly 69 comprises a roller cover plate subassembly 60, toothed rollers 130, 132, 133, 134, 135 and 136 within the roller cover plate 60 and a toothed roller drive assembly 150 supported on the top of the cover plate subassembly 60.

The cover plate assembly 60 comprises a flat rigid plate 70 at the front edge of which is a front downwardly extending lip 71; at the rear of the plate 70 is a rear downwardly extending lip 72; at the right side thereof is a downwardly extending lip 73 and at the left side thereof is a downwardly extending lip 74. The end plates 71 and 72 extend the same distance downwards of the top of plate 70. The plates 73 and 74 extend downward the same distance. All the walls, 71, 72, 73 and 74 are vertical and flat on their interior and exterior and are firmly joined together at the corners, e.g., where wall 71 joins 73, where wall 73 joins wall 72, where wall 72 joins wall 73, where wall 71 joins with 74, as well as where each of those walls 71–74 joins with the plate 70. There is a central hole in the plate 70 which plate is firmly attached to the bottom of the tube 66; it has the same diameter as the internal diameter of tube 66. The internal diameter of the tube 66 is about $\frac{1}{16}''$ larger than the external diameter of the spiral 138. Cover 69 is located with the flat top 70 horizontal. The geometric center of the plate 70 is located in line with the longitudinal center axis of the tube 66 and of the central longitudinal auger shaft 137. Plate 70 is rectangular, not square.

The lower edges of plates 73 and 74 are bevelled with their lower edges outward (see FIG. 14) whereby to peel earth towards the rollers on downward motion of the assembly 69. The teeth on the end toothed rollers 130 and 132 extend beyond the walls 71 and 72. The overall outline of assembly 69 is thus a square.

The roller cover plate 60 supports therein a plurality of like parallel cylindrical toothed rollers 130, 132, 133, 134, 135, 136. The front roller 130, is arrayed with its longitudinal axis parallel to the wall 71. The rear roller 132 is arrayed with its longitudinal axis parallel to the axis of the roll 130. The left central roller and right central roller 134 and 136 are arranged on each side of auger 67 as shown in FIG. 9, with their longitudinal axes coaxial with each other and parallel to the axes of rollers 130 and 133, 132 and 135.

Roller 133 is neighbor to, but spaced away from, and central of roller 130; roller 135 is neighbor to but spaced away from, and central of roller 132. The axes of rollers 130, 132, 133, 134, 135 and 136 lie in the same flat plane, which plane is parallel to the plane of the flat plate 70. Each roller, as 130, has a series of teeth 131 extending from one end to the other of the roller with the teeth on one side of the opening in plate 70 to tube 66 in a right hand spiral; the teeth on the other side are arrayed in a left-hand spiral.

The teeth on the toothed rollers are arranged to rotate in such directions, as shown by arrows 130A and 132A in FIG. 13 to contact the earth to the front and rear of walls 71 and 72 respectively and urge that earth inward to the auger 67. The angled array of the roller teeth provide that on rotation of roller 130 in a clockwise direction as seen in FIG. 13, with the surface as shown in FIG. 10 rotating downward the teeth thereof urge the earth contacted thereby centrally, i.e., away from the sidewalls 74 and 73 and toward the central longitudinal axis of tube 66.

Each toothed roller 130 is supported by spaced apart end bearings as 140 and 141, in plates 73 and 74, e.g., the roller 132 is similarly provided with a set of spirally arranged teeth 133 and provided with bearings 142 and 143 in walls 73 and 74; the left central roller 134 is provided with central and lateral bearings 144 and 145 and the right central roller 136 is provided with central and lateral bearings 146 and 147. Bearings 144 and 146 are located in journals firmly fixed to plate 70 as shown in FIGS. 10 and 14, the supports for the rollers have a smaller outer diameter than do the rollers. In the preferred embodiment, 20, the rollers are 6" diameter, being made of 6" O.D. pipe while the bearings are somewhat smaller and thereby maintained spaced from the earth contacted by the teeth on such rollers. As shown in FIG. 14 the side walls 73 and 74 are bevelled inwardly at 60° to the horizontal and sharp edged at their bottom edges 73A and 74A respectively to peel the earth contacted thereby and force such "peeled" earth into the path of the teeth on the neighboring rotating rollers; this provides that the thus "peeled" earth not initially contacted by the roller teeth is forced into contact with those rotating and angled teeth and moved by those teeth to the auger 67. The earth near the front and rear walls 71 and 72 is initially contacted by the teeth on the rollers as, in the preferred embodiment, the teeth project beyond the walls 71 and 72; this avoids wedging of the plate 70 in the hole formed by the cover plate assembly 69 moving downward in the earth as below discussed in regard to the action shown in FIGS. 1, 15 and 16.

A gasoline motor 221 is firmly fixed on top of the cover assembly 69. It is operatively connected to and drives shaft 152 which shaft is fixedly connected to drive gear sprocket wheels 154 and 155, and journalled in journals 152A, 152B, 152C and 152D which journals are firmly fixed on the top of plate 70.

Wheels 154 and 155 engage the gear wheels 164 and 165 (not shown) which are attached onto the shaft 130D of roller 130; that shaft 130D is supported by bearings 140 and 141 of the roller 130 in walls 73 and 74. Thereby, actuation of motor 151 operates sprocket or gear wheel 154 and roller 130.

Roller 130 has a central section 130E, a left section 130B, and a right section 130C; all firmly joined to shaft 130D; these sections are sturdy cylindrical rolls that support teeth 131 thereon. The teeth are rigid sturdy equal-sized flat elements rectangular in transverse cross-section with their flat faces at an angle of 45° to the longitudinal axis of the roller 130. The teeth are ¾" long and ¾" wide and firmly fixed to the roller 130 while arranged in a spiral path so that one tooth feeds to the next without compression therebetween.

Chain 154A on wheel 154 drives sprocket wheel 164 near section 130B and wheel 164 rotates shaft 130D of roller 130. (FIGS. 12–14). Shaft 152 supports a similar drive chain sprocket wheel 155 on the opposite end of shaft 152 and that wheel is operatively attached to a similar drive chain as 154A and thereby drives a sprocket wheel near roller section 130C on the side of toothed roller 130 that is adjacent to side plate 73.

A resilient rubber dirt seal shield 164A surrounds chain 154A; it is supported at its top on plate 70 and bears against the neighboring and facing faces of the cylindrical roller sections 130E and 130B. A snug fit of a pair of bearings 164C which are firmly attached to shaft 130 support the seal on the shaft 130D on either side of wheel 164.

A bracket 164D supports the bearing 164C on the plate 70. The seal 164A prevents dirt from interfering with the lubricated action of the chains and sprockets driving rollers as 130, 132, 133, 134, 135, 136. Each toothed roller as 130 and 132–136 has similar pairs of drive sprockets, chains therefor and dirt shields.

Shaft 152 also carries a pair of like drive chain sprockets as 156 and 157: Sprocket 156 carries and drives a chain 156A, chain 156A drives a corresponding drive sprocket 158 on a rotatable drive shaft 157 which is supported rotatably in four journals, 157 A–D, each firmly fixed on plate 70 in the same manner as (152 A–D) journals are provided for shaft 152. Shaft 157 is parallel to shaft 152 and spaced above the axis of roller 133. Shaft 157 thus is driven by chain 156A and drives a gear or sprocket wheel 159 corresponding to sprocket wheel 154 on shaft 152, this wheel 159 is operatively attached to a chain 159A corresponding to chain such as 154A; and that chain drives a sprocket on gear wheel 159C on the shaft of toothed roller 133 corresponding to sprocket 164 on shaft 130C of roller 130, and at the same speed and in the same direction.

Roller 134 is provided with a drive shaft 280 similar to shaft 157: Shaft 280 is rotatably supported in journals 280A and 280B on top of plate 70; a drive sprocket 281 fixed thereon connects to a chain and that chain to a sprocket on roller 134 similar to sprocket 164 on toothed roller 130. A drive chain sprocket 282 (similar to 158 on shaft 158) is driven by chain 156A and fixed to shaft 280. Accordingly, each of the toothed rollers as 130, 133 and 134 rotate in the same direction.

Toothed rollers 132 and 135 each have the same structure as do toothed rollers 130 and 133, and, as a drive mechanism, each has a sprocket shaft (152A for 132, 157A for 135) each rotatably mounted on a group of four journals therefor and fixed to plate 70 as does shaft 152 of roller 130 and a pair of roller chain drive sprockets as 154 of roller 130 and driven sprockets as 164. Toothed roller 136 is provided with journals 146 and 147, shaft and one driven sprocket 296 and is driven by sprocket 291 on shaft 157. Rollers 134, 135 and 132 have the corresponding parts of rollers 136, 133 and 130 respectively.

Rollers 132 and 135 are operatively connected as schematically shown in FIGS. 9–14. However, rollers 132, 135 and 136 rotate in a direction opposite to the direction of rotation of rollers 130, 133 and 134 because a reversing gear arrangement 270 provides for reversal of the direction of rotation of the sprocket wheels for the toothed rollers between rollers 134 and 135 and a reversing gear 290 is located between toothed rollers 133 and 136.

The reversing gear assembly 270 comprises a drive gear 271 on shaft 280, a drive reversing gear 272, a driven reversing gear shaft 273, a reverse drive gear 274, a reverse drive chain 275 and a reverse driven gear 276.

The shaft 273 is rotatably supported in journals therefor, 273A and 273B; wheel 271 is firmly fixed to shaft 280 which is driven by chain 156A, which chain 156A is operatively engaged with sprocket wheel 282 on shaft 280. Wheel 271 engages driven sprocket 272 and is fixed to shaft 273; shaft 273 is rotatably supported in journals 273A and 273B and is fixed to a reverse driven gear sprocket wheel 274 as shown in FIG. 9. Sprocket wheel 274 drives a chain 275 and that chain engages and drives a driven gear 276 on shaft 157A. Shaft 157A is driven by sprocket gears 277 and 278 and drives chains 277A and 278A as provided for roller 130 and has journals 276A, 276B, 276C and 276D as provided for shafts 157 and 152 to drive roller 135.

Shaft 152A is provided to drive roller 132. Shaft 152 is a rigid shaft rotatably located for journals 285A, 285B, 285C, and 285D, and has fixed thereto toothed roller drive sprocket 286 (roller drive chain 286A attached thereto) and chain driven sprocket wheel 287 connected as provided for on toothed roller 130 by chain 278A to wheel 278.

The reversing unit 290, with parts of the drive unit for roller 134, comprises elements 291, 292, 293, 294, 295, 296, 297, and 298 corresponding respectively to elements 271, 272, 273, 274, 275, 276, 277 and 278, assembly 270 and toothed roller 136.

Wheels 156, 158, 282, 278 and 287 are all the same size diameter and width: Wheels 286, 277, 281, 159, 154 and 297 are also all the same size diameter and width; wheels 296, 294, 276 and 274 are the same size diameter and width; wheels 271, 272, 291 292, 269, 159 and 164 are the same size diameter and width. Thus rollers of assembly 69 rotate at the same peripheral speed, though some rotate in different directions than do others.

Accordingly, the toothed rollers 130, 132, 133, 134, 135 and 136 are driven in the direction of the arrows 130A, 132A, 133A, 134A, 135A and 136A shown in FIG. 13; the motor 151 provides for driving earth contacted by the bottom surface of those rollers toward the center line of the assembly 69 to a point below the interior cylindrical chamber of tube 66 and provides that the auger portion 68 engage such driven dirt and move it upwardly of the tube 66.

The auger assembly 33 comprises the auger tube 66 and auger 67 and motor 77 as shown in FIG. 6, the motor 77 (or the drive gear powered from a drive shaft as shown in FIG. 8) is firmly attached to the top of tube 66. A bearing 78 for shaft 137 is firmly attached near to the top of tube 66 below the attachment of the energy source for shaft 137 to shaft 137, e.g., motor 77 or gear 187. Tube 66 has a discharge port 76 below the upper end of the screw 138 for discharge therethrough of material carried up tube 66 by the rotation of the auger 67. The central shaft of the auger 67 is firmly attached to the screw 138 thereof. Shaft 137 is rotatably located in a bearing 78 firmly fixed to the top of the tube 66 and at a bearing 79 (not shown) at the lower portion of the tube 66 near plate 70. A lower pointed portion 68, of the auger 67 extends below the bottom edges of the plates 71, 72, 73 and 74 for a distance of about two feet. Another helical, portion 64, of the auger 67 is located within the tube 66 and has a uniform pitch throughout its extension through the interior of the tube 66; it extends upwardly above the opening 76 in the face of the tube 66, but not as high as the bearing 78.

A sloped chute 75 is firmly attached to near the upper end of tube 66, the chute has a lower surface 75A located below opening 76 near the top of the tube 56 for the discharge of the material carried by the spiral 138 to the chute 75. A hydraulic motor 77 is operatively attached to the shaft 137 of the auger 67.

It is also within the scope of this invention that a conventional 10 H.P. gasoline engine 181 be attached to the cover 70. It operates a pulley 182 which drives drive shaft 180 at clutch 183; the other end of the clutch drives a rigid shaft 184 that is attached by journals 184A and 184B to the outer surface of tube 66. The shaft 184 extends to above the top of tube 66 and a drive sprocket 185 is firmly fixed to shaft 184. The sprocket 185 drives a chain 186 that is operatively attached to a driven sprocket 187 on the upper end of auger shaft 137. A speed control 188 is attached by hydraulic lines 188A to actuate a piston 188B to control the throttle 181A of motor 181. A hydraulic control 189 operates the clutch 183 by a hydraulic line 189A to clutch control piston 189B that is operatively connected to the clutch 183. Engine 181 has a self starter, 179, actuated by button 179A on the control panel of assembly 22.

A gasoline motor 221 also supported on plate 70 on the other side of axes of tube 66 from the motor 181 operates on a sprocket 222 through clutch 223 to operate drive shaft 152. A throttle control 208 is operatively connected to the engine 221, by throttle control piston 229A via throttle line 229B. Piston 29A controls throttle 29 of engine 221. Engine 221 has a self starter 20 actuated by starter button 20A.

A gas line 224 for motors 181 and 221 extends from the tank 226 on hump 44 via rigid lines attached to the tower 93 and link arm 111 and tube 66 with flexible lines between the line portions attached to rigid members. Branch line 225 extends from line 224 to motor 221 and line 224 extends directly to motor 181.

The tower assembly 31 comprises a base subassembly 91, a rigid vertical hollow cylindrical mast 93 and a joint assembly 95 operatively connected. Link assembly 35, and a conveyor control master piston 250 are supported thereon and are operatively connected thereto.

The base assembly 91 comprises a rigid fixed plate 92 firmly fixed to the rear deck 44 of the frame 22 and a rotatable plate 94. Plate 94 is firmly fixed to the mast 93. A rigid cylindrical shaft 90 is firmly fixed to the plate 92 and the inner cylindrical surface of a sturdy cylindrical hollow mast 93 smoothly yet rotatably is located therearound; the bottom of plate 94 and the top of plate 92 are flat and greased to provide a smooth slidable contact therebetween. Firmly affixed to mast 93 at the top thereof is central bottom control plate 103, a wide rigid sturdy circular flat annulus.

A central piston support arm 259 is firmly attached to mast 93 near to the top of that vertical arm. Arm 259 is a rigid I-beam and extends horizontally from mast 93. It is braced by a fish plate as 260 between arm 259 and mast 93 and also firmly attaches to plate 103, which plate 103 is also firmly attached to mast 93, with fish plates as 261.

Joint assembly 95 comprises a rigid primary arm 96, a rigid secondary arm 97 and a conveyor sling assembly 102, pivotally and operatively interconnected.

Arm 96 is a straight rigid I-beam firmly connected to a rigid cylindrical shaft 196 that is, in its lower part, smoothly rotatable in the inner cylindrical surface of mast 93 and the upper portion of which extends upward of arm 96; the upper end 198 of shaft 196 is firmly connected to arm 96 by a rigid truss element 199. The central portion of arm 96 is firmly attached to a central control top plate 99. Shaft 196 extends through plates 103 and 99 and arm 96 and is firmly attached to plate 99 and arm 96. Plates 103 and 99 are circular and coaxial with each other and shaft 196.

Arm 96 is firmly attached at its distal end to a vertical middle link arm pin 98 and a flat bottomed middle bottom central plate 241. Plate 241 is a rigid flat topped circular plate. Pin 98 extends upward of the top of plate 241 in its center and pivotally connects to plate 243 and arm 97.

Arm 97 is a rigid elongated I-beam. The arm 97 is pivotally attached at its central end to pin 98 and is firmly attached to upper middle central plate 243, a flat-bottomed rigid circular plate of slightly lesser diameter than plate 241. Pin 98 and plates 241 and 243 are coaxial. The distal end of arm 97 is attached to a vertical cylindrical peripheral link arm pin 245 through a circular bottom distal central plate 247, to which (247) it (97) is firmly attached. Plate 247 is a rigid flat topped circular plate and arm 97 is directed at the center thereof (also the center of piston 251): top distal central plate 249, identical in size and shape to plates 243 and 99 is supported on top of plate 247; plates 247, 241 and 103 are of same size and shape.

The conveyor sling assembly 102 comprises a slave piston 251, a yoke 104 and guide members 255 and 257 slidably yet operatively connected to distal top central plate 249. Plate 249 has a flat bottom and rests on top of flat top of distal bottom plate 247. Plates 247 and 249 are connected by a rigid vertical cylindrical pin 245 and are coaxial therewith. Pin 245 is a large diameter cylindrical shaft with a large upper head firmly connected to plate 249; it permits that piston 251 and yoke 104 therebelow are rotatable about a vertical axis through the center of pin 245.

Plates 241 and 243 provide that arms 96 and 97 are rotatable about a vertical axis through pin 98 and plates 99 and 103 provide for rotating of arm 96 about a vertical axis through shaft 196 and plates 92 and 94 provide that mast 93 is rotatable about a vertical axis (coaxial with shaft 90) fixed relative to deck 44 of frame 172. The top of a rigid cylindrical piston shaft 252 is attached to a piston head 262 which is slidable within piston chamber 251. The bottom of piston shaft 252 is attached to the center part of upper arm 263 of yoke 104 and is located above the longitudinal center line of conveyor 37. Yoke 104 comprises arms 263, 253 and 254. The arm 263 is firmly attached to left vertical yoke arm 253 and right vertical yoke arm 254. Arm 253 is attached to a rigid left cylindrical guide arm 255; arm 254 is attached to a right rigid cylindrical vertical guide arm 257. Arms 255 and 257 are slidably located in hollow vertical cylindrical sleeves 256 and 258 respectively which sleeves are firmly located on edges of plate 249, diametrically across from each other, pin 245 being on a straight line therebetween. The lower end of arms 253 and 254 are both provided with circular holes (as 268 in 253) for location therein of a pivot rod as 264. Rod 264 is a rigid cylindrical bolt with an enlarged head at one end (not shown) and is provided at the other, threaded end, with a releasable holding means as a nut 265. The frame elements 195 and 194 of the conveyor are provided with a series of pairs of coaxial cylindrical holes (as 266, 267' and 267) spaced along the length of members 194 and 195 and located near the center of length of conveyor 37. The rod 264 rotatably yet smoothly fit in two of any one pair of such holes and provides for pivotal location of the portions of the conveyor on each side of rod 264 relative to sling assembly 102 as may be desired for substantially balanced support of the needed lengths of the conveyor, as below described in relation to the operation of the apparatus 25 as shown in FIGS. 2, 18, 20 and 22.

The conveyor assembly 37 comprises a rigid rectangular frame 190 and a conventional flat conveyor belt 192 located on a series of rollers as 191 rotatably mounted on frame 190 in conventional manner.

The frame 190 comprises straight rigid left and right rigid side members 194 and 195. The conveyor element is of a length sufficient (as shown in FIG. 15) to reach to the first compartment, as 63, of the carrier 59 from the discharge chute 75 of assembly 33 when the link assembly 35 is arrayed with its length generally parallel to the length of the carrier 49.

The yoke assembly 104 is supported by the piston shaft 252 in the piston cylinder 251 from the distal end of the secondary joint 97 and supports the conveyor at its middle with one end thereof adjacent and below the discharge chute 75 of the assembly 33 and the other end adjacent and above the top of any desired chamber as 63, 62 or 61 of the receptacle 49.

It will be noted that the point of attachment of the sling 102 to the frame for conveyor belt 37 is not required to be the same in all operative positions of the apparatus. For instance, in FIG. 2, during the orientation of the auger subassembly 33 in line with the longitudinal axis of the frame 172 the attachment of rod 264 of the sling is substantially to the middle of the entire conveyor belt length as the conveyor may be filled with dirt from the point of discharge of discharge chute 75 onto the conveyor belt to the discharge thereof. However, in an orientation of parts such as in FIGS. 18 and 22, earth is not initially put at the end of the conveyor belt.

Figure 20:
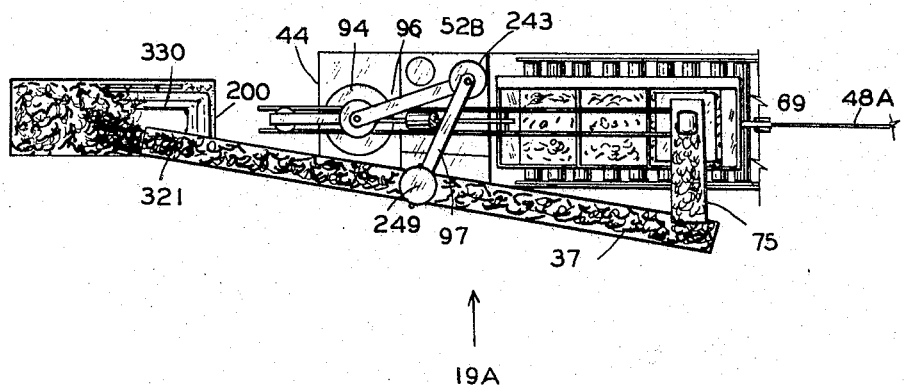
FIG. 20 is a top view along the direction of the arrow 20A of FIG. 19.

Additionally, during the discharge of the material from the carrier 49 to the grave site located along direction of length of frame 172 as shown in FIG. 20, the conveyor support rod 264 is located again near or at the center of length of conveyor 39.

Figure 18:
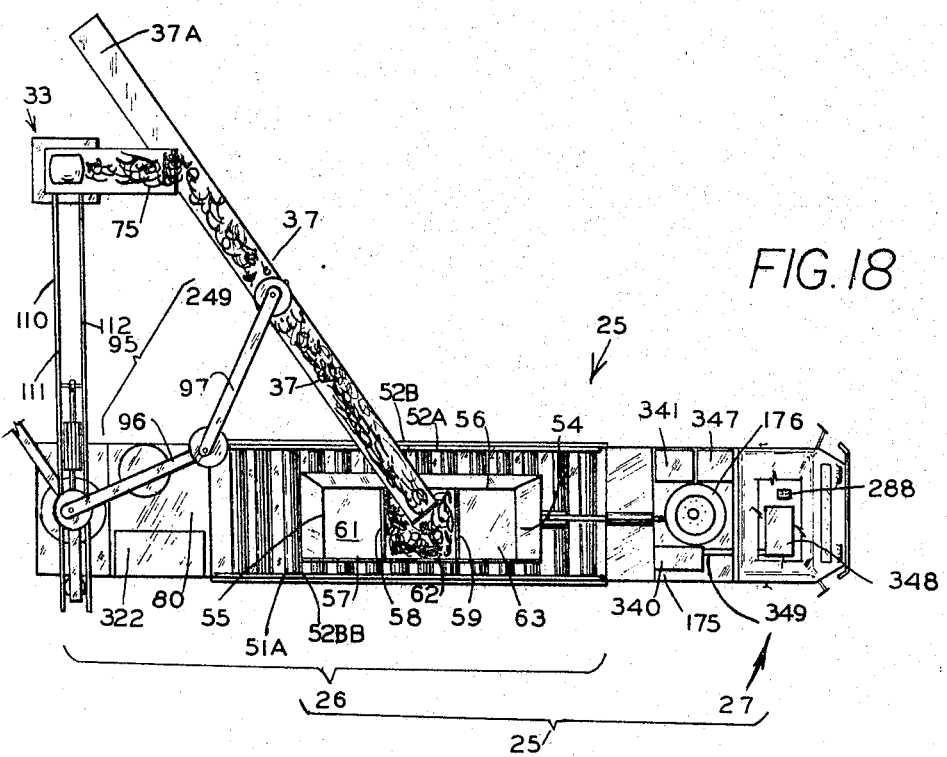
FIG. 18 is a top view of the apparatus shown in FIG. 1 when the auger assembly 33 is located to one side of the carrier subassembly.

When the apparatus is used located to one side of the carrier frame 172 as shown in FIG. 22 or 18, the attachment of the conveyor support may be moved along the length of the conveyor away from the center of the conveyor length as shown in FIG. 4, and above discussed, to permit the yoke 104 to be located in such position as desired along the length of the conveyor frame.

A rotatable conveyor collar assembly 370 is rotatably attached to the tube 66: it is rotatably supported on collar 379 which is firmly fixed to tube 66. The assembly 370 comprises a rigid hollow cylindrical sleeve 371, arm 372, solenoid brakes 375 and 376 and solenoid shoes 373 and 374. Rigid sleeve 371 rotatably fits on tube 66 above collar 379. Arm 372 is a rigid channel beam that extends horizontally from sleeve 371 below the bottom of discharge chute 75; chute 75 is fixedly attached to the top of sleeve 371 and rotates therewith. Solenoid brakes 375 and 376 are identical to shoes 240A–240I of assembly 95: these shoes bear on tube 66 to fix the position of assembly 370 thereto. Solenoids 373 and 374 are firmly supported on arm 372 and, when deenergized, the springs thereof drive the shoes thereof into operative engagement with sides 194 and 195 of conveyor 37 and hold the conveyor frame in fixed position relative to chute 75.

Control switch 377 at console 322 provides the operator means for energizing solenoids 373 and 374 to release the conveyor frame from its attachment to assembly 370, and, by opening the switch 377, to form an operative attachment between frame 190 and assembly 370.

Control switch 378 at console 322 provides the operator means for energizing solenoid 375 and 376 to release the frame 370 from its attachment to tube 66. Switches 377 and 378 are operatively connected to power source 288, thereby the connection of the frame 190 of the conveyor 37 to the tube 66 of the subassembly 33 maintains the conveyor in an operative position relative to chute 75 and this relationship is readily supplemented and fixed by the arms 96 and 97 which are fastened in position as desired by solenoids shown in FIG. 4 and below described.

The link assembly 35 connects the tower assembly 31 and the auger assembly 33. It comprises a pair of rigid elevator rod units 110 and 115, and an auger assembly elevator piston assembly 36. The rod units, diagrammatically shown in overall side view in FIGS. 1, 2 and 15 through 22 have parts thereof shown in greater detail in FIGS. 2, 4, and 6. The upper rod unit subassembly 110 comprises two separate parallel rigid rods 111 and 112 while subassembly 115 is composed of two similarly rigid longitudinally extended rods 113 and 114.

Rods 111 and 112 are pivotally attached to mast 93 by a rigid cylindrical pin 210 that extends through the mast 93 along a diameter thereof and extends laterally thereof: rods 111 and 112 each are pivotally attached to a lateral projection thereof.

Rods 113 and 114 are each attached to a rigid cylindrical pin 209 that extends through mast 93 along a diameter thereof and extends laterally thereof. Rods 113 and 114 are pivotally attached to a lateral projection thereof.

Rods 111 and 112 are each rigid channels with their bases facing each other and extend from their pivotal attachment to the tube 66 to their pivotal attachment to mast 93, and therepast to a link 311 at the ends thereof opposite to their pivotal attachment to collar 300 on tube 66.

A vertically elongated cylindrical pivot collar 300 is rotatably attached to the outside of tube 66. A pair of upper link pivots, each formed of a cylindrical stub shaft, 301 and 302 extend laterally from either side of collar 300; they are arranged along a transverse diameter of tube 66. In the same vertical plane as that determined by axes of shafts 301 and 302 and shaft 137, lower pivot lugs 303 and 304, rigid and cylindrical, horizontally extend from diametrically opposite positions of the collar 300. Cylindrical lugs 303 and 304 are coaxial. Cylindrical lugs 301 and 302 are coaxial. The vertical distance between the axes of lugs 301 and 303 is the same as the vertical distance between the axes of pins 209 and 210 on mast 93. Rod 111 is pivotally connected to pins 210 and 301; rod 112 is attached to pins 210 and 302; rod 113 is pivotally attached to pins 303 and 209; rod 114 is pivotally attached to pin 304 and rod 209.

Rods 111, 112, 113 and 114 are all of the same length between their pivotal connections to tube 66 and mast 93. Arms 111 and 112 extend beyond mast 93 to actuate a conveyor control assembly. A horizontal cylindrical piston locator rod 116 is pivotally attached to rods 111 and 112 halfway between the connection thereof to tube 66 and mast 93.

A lug 127 firmly fixed to mast 93 above plate 94 and below pin 210, at or in the immediate vicinity of the level of pin 209 extends toward tube 66.

An auger assembly elevator piston assembly 36 is attached at one end to lug 127 and at the other to rod 116. The piston assembly 36 comprises a piston chamber 119, a piston 120 within the piston chamber, a piston shaft 122, a yoke 128 and pin 129. Piston chamber 119 is firmly attached by its base 123 to pin 116. Piston 120 is slidably located in chamber 119 and the upper end of shaft 122 is firmly attached to that piston. The lower end of shaft 122 is firmly and rigidly attached to one end of yoke 128, the other end of yoke 128 supports a rigid cylindrical pin 129 and pin 129 is pivotally supported in lug 127.

Piston 120 slidably extends into piston chamber 119. The piston chamber 119 is operatively connected as below described with a hydraulic control system to extend arm 122 from chamber 119 and raise pin 116 and sleeve 300. Accordingly, the link assembly 35 operatively connects the mast 93 and the tube 66 and provides for parallel motion of the tube 66 up and down parallel to the mast 93 while tube 66 is being supported by the mast 93.

The sleeve 300 is located on tube 66 between upper sleeve locator collar 305 and lower sleeve locator collar 306. These collars firmly fit and are firmly though adjustably fixed to tube 66 and, as they locate sleeve 300 and sleeve 300 is movable, provide for the upward motion of sleeve 300, under urging of piston 119, to raise tube 66 and provide that lowering of the tube 66 during its normal digging operation moves end 310 of rod unit 110 upward and bring the conveyor assembly (through action of pistons 250 and 251) downward. The rotatable connection of sleeve 300 to tube 66 permits the edges 71, 72, 73, and 74 of assembly 69 to be oriented as desired with respect to the direction of rod units 110 and 115 and with respect to the longitudinal axis of the frame 172 of trailer 26, e.g., as shown in FIGS. 18 and 22. A rigid peripherally serrated or toothed annular ring 307 is firmly fixed to periphery of collar 306. A rigid straight vertically moveable T-shaped rod 308 is held slidably in a vertical guide sleeve 309 which is fixed to outside of sleeve 300. Rod 308 may be located in such of the denticulations, space between teeth, or peripherally open serrations of collar 307 as desired or raised as shown in FIG. 21 and, so, release the vertical portion of rod 308 from engagement with the denticulations or serrations of ring 307 and allow rotation of the plate 70 to such positions as desired relative to rods 111–114 prior to fixing its orientation relative thereto by returning the rod into engagement with one of the serrations on the collar 307. The cross bar 308A of the T-shaped bar rests on top of sleeve 309 and is held thereby. Sleeve 300 on tube 66 is located to maintain the lower end of rods 113 and 114 at a height above the bottom of rollers as 130, 132, 134 and 136 of about seven feet; this is to permit the extension of the toothed rollers as 130, 132, 134 and 136 to six feet below the ground level (the conventional depth for graves).

The center-to-center distance from the axis of pins 301 and 302 on collar 300 to pin 210 on mast 93 is twice as great as the center-to-center distance from pin 210 to the pivotal pin holes 310A and 310B for link 311. Holes 310A and 310B are coaxial. The master cylinder 250 and, the slave cylinder 251 are of the same internal diameter and length. Cylinder 250 has a piston 314 slidably located therein and a shaft 313 firmly fixed thereto, the cylinder 250 is thereby divided into an upper compartment 316 and a lower compartment 315. A collar 312 at end of shaft 313 and firmly fixed thereto rotatably connects with link 311. Link 311 is rotatably mounted in holes 310A and 310B. The top of piston cylinder 250 is firmly fixed to the bottom of piston support arm 259 and the axis of cylinder 250 is vertical; the bottom of cylinder 250 is above the top of end 310 of rod unit 110 when unit 69 is at the bottom of its travel as shown in FIG. 17 and the length of shaft 313 is long enough to accommodate the motion of link 311 in the position of the assembly 69 at its maximum height, e.g., during initial discharge of excavated earth stored in receptacle 49 as shown generally in FIG. 19.

Slave piston cylinder 251 is a rigid vertical cylinder firmly fixed at its top to plate 249. Slave piston cylinder 251 has a piston 262 slidably located therein and a shaft 252 firmly fixed to the bottom thereof. The cylinder 251 is thereby divided into an upper compartment 315A and a lower compartment 316A. A hydraulic conveyor lowering line 317 connects chambers 315 and 315A; another hydraulic conveyor raising line 318 connects chambers 316 and 316A. Each piston chamber is provided with hydraulic fluid feed and bleed line valves as 319. The pistons 250 and 251 provide that rod 264 of yoke 104 at the center of length of conveyor 37 moves up and down the same amount as end 310 of unit 110 moves down and up. However, sleeve 300 moves vertically twice as much as does end 310 of unit 110 and the end of the conveyor 37B, held to the tube 66 by bracket 370, moves vertically twice as much as does rod 264; thereby the discharge end of the conveyor stays at the same height relative to mast 93 during operation of the apparatus 20, notwithstanding the change in height of the same portion (76 and/or 69) of tube 66 during such operation. Lines 317 and 318 are hydraulic lines.

While plate 243 is rotatable with respect to plate 241 above pin 98, a series of like brake units as 240A, 240B and 240C provide for holding plates 243 and 241 in fixed relationship when desired and to release the attachments therebetween on command by the operator of apparatus 20 from the control console 322. A series of like brake units 240D, 240E and 240F similarly provide for fixing and releasing the position of plate 99 relative to plate 103 and a series of like brake units 240G, 240H and 240I provide for fixing and releasing the position of plate 249 relative to plate 247. Units 240A through 240I are identical to each other. Brake unit 240A is a solenoid brake; it comprises an electromagnetic solenoid 242 with a movable pointed shoe 244; plate 241 has bolted to the top thereof an annular hard rubber ring 246; the interior diameter of the annular ring 246 is the same as the outer diameter of plate 243 and is coaxial therewith. The top surface of ring 246 is coplanar with the top surface of plate 241.

Shoe 244 is pointed and bears on plate 246 sufficiently firmly to prevent motion between plates 241 and 243 and is urged theretoward by spring 269. Solenoid 242 is firmly supported by bracket 289 on plate 243. A double strand electric conductor cable 248A connects solenoid 242 to a source of electric power 288, a battery, via switch 288A at console 322. Solenoids 240A, 240B and 240C all are actuated by battery 288 via line 287A and switch 288A; solenoid brakes 240D, 240E, and 240F are actuated by battery 288 through a switch 288B via line 287B, and solenoids 240G, 240H, and 240I are actuated via line 287C by battery 288 via another switch 288C. Switches 288A, 288B and 288C are all located at console 322, thereby arm 95 and arm 96 of assembly 95 can be separately fixed in such orientation relative to mast 93 as desired, and yoke 104 also separately oriented as desired relative to arm 97 by an operator at console 322.

While a similar set of brakes as 240A–240I may be used to locate plate 94 relative to plate 92, it is preferred to use a series of equally sized and spaced vertical cylindrical threaded holes 323, arranged in a circle in plate 92 concentric with shaft 90 and a series of like vertically extending cylindrical holes, 325, each hole of the same diameter as the major diameter of the threaded holes of series 323 through plate 94 and equally spaced from each other around a circle coaxial with the circle of series 323. The series of holes 323 and 325 provide for placing two or more heavy threaded bolts therethrough as 326 and 327, to locate plate 94 and assembly 35 as desired with respect to each other in a firm yet adjustable position. Series 323 and 325 each have the same number of holes (24) for simplicity of operation.

A foot assembly 331 serves to steady the mast 93 and support the assembly 33 when assembly 33 is being supported off the ground and in the air while being located over such portion of the grave site as is desired to be opened. The foot assembly comprises a rigid long leg 332, a short locator sleeve 333, and a broad foot 334. Locator sleeve 333 is a generally horizontally elongated, two foot long, rigid sleeve rectangular in interior cross section, it is firmly attached to plate 94 with its central axis directed at the axis of shaft 90. Leg 332 is a rigid I-beam that fits smoothly at one end into sleeve 333, and may be held therein by a bolt. Foot 334 is attached at the other end of leg 332 and is provided with a screw jack 335 to adjust the distance of the bottom of foot 334 from bottom of leg 332; foot 334 is a sturdy 18-inch diameter round plate.

The control assembly 39 provides for control of the motors and brakes used to operate and control the units of the assembly 20. The control assembly 39 comprises a control console 322 and energy source assembly 327 for the hydraulic units.

Assembly 327 comprises in operative combination, a pump 340, a high pressure liquid container 341, a high pressure hydraulic main line 342, and a control valve 344 for the auger assembly elevator piston 119, a line 345 from the valve 344 to the piston 119, a return line 346 from piston 119 to liquid reservoir 347, and a feed line 348 from reservoir 347 to pump 340. Pump 340 is driven by a power take-off 349 from the motor 348 of the tractor 27.

The energy source assembly for the hydraulic motor 77 comprises an adjustable control valve 350 operatively attached to line 342, high pressure motor control line 351 to motor 77 and a motor return line 352 connected at one end to the motor 77 and at the other end to the reservoir 347. Where a hydraulic motor is not used the valve 188 on console 322 may be operatively connected by high pressure hydraulic line 188A to a throttle control piston 188B; piston 188B is operatively connected to the throttle control 181A of the gasoline motor 181; piston 188B is thus operatively connected to line 342 where the gasoline engine 181 is used in lieu of the hydraulic unit 77 to power the auger 67. A return spring 353 (not shown) operates to close the throttle 181A of the engine 181 to the idle position thereof.

The energy source control assembly for the toothed rollers 130, 132, 134 and 136 comprises in operative connection a roller motor throttle control valve 208, a high pressure line 229B therefrom to a roller motor throttle control piston 229A supported on motor 221 and operatively connected to the throttle 229 of motor 221 for the rollers and a return hydraulic line from piston 229A to reservoir 347.

The solenoid brakes 240A–240I are each operatively connected by double conductor wires 248A, 248B and 248C respectively to switches 288A, 288B and 288C respectively on the console 322, and, therethrough, to battery 288 of the tractor 27.

The console board 322 supports each of hydraulic valves 350, 208, 189, 344 and 188 and switches 288A, 288B and 288C, 377, 378 220A and 179A are firmly attached to hump 43 of frame 22 whereby the operator may control the operation of apparatus 20 while observing same.

In operation of apparatus 25 the tractor 27 serves to locate the trailer subassembly 26 in the vicinity of a site 200 at which a grave is to be dug. For this purpose, as shown in FIG. 1, the auger subassembly 33 is located with the tube 66 vertical; the motor 77 or 180 is used to drive the shaft 137 of the auger 67 within the tube 66. The tube 66 is firmly held by the links 110 and 115 and sleeve 300 and rod 308 from rotating about its vertical axis; the arms 111 and 112, 113 and 114 are pinned by horizontally extending stub shafts 111A, 112A, 113A and 114A to sleeve 300. The motor smoothly rotates the bottom portion, 68, of the auger 67 which is exposed to the earth, said auger then holding said rollers in the earth. The rollers 130, 132, 133, 134, 135 and 136 are concurrently smoothly driven, powered by the motor therefor as 221 in the direction of the arrows 130A, 132A, 134A, 135A and 136A, respectively. The teeth as 131 on each of the rollers at 130 drive the earth contacted thereby towards the center of the cover subassembly 69 and the blade 138 of the auger 67 drives the dislodged earth upward of tube 66. The dislodged earth is driven by auger 67 upwards of tube 66 and is discharged from the opening 76 in the tube 66 onto the chute 75 and from there to the conveyor 37. The conveyor belt 192 moves the topmost portion of the earth thus excavated and conveyed into the center compartment 61 of the carrier 49 as shown in FIG. 1.

Figure 16:
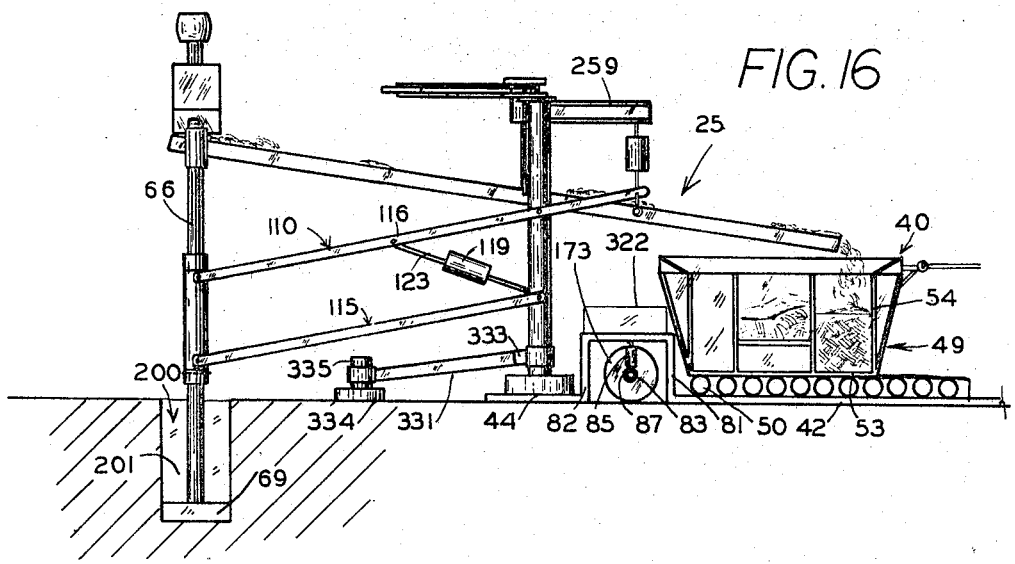

On continued downward motion of the subassembly 33 the rear portions of arms 111 and 112 near link 311 force the liquid in chamber 314 of cylinder 250 therefrom along the line 317 to chamber 315A to cylinder 251. The cross-sectional area of the cylinder 250 is the same as that of the cross-sectional area of the cylinder 251 and piston 314 accordingly moves vertically the same distance that the piston 262 moves in the cylinder 251. Accordingly, the center of the conveyor is moved the same vertical distance as the vertical travel of the link 311; thereby, as the discharge point of the discharge chute 75 moves downward a given distance, e.g., 4 feet, the support sling 104 for the center of the conveyor assembly moves down 2 feet; thus the discharge point 311 of the conveyor 37 is not changed in vertical height relative to the chamber into which it discharges (as 61, 62, or 63) while the subassembly 33 is moved downward. (Shaft 313 displacement is negligible. As the discharge of the subassembly 33 completes the removal of top soil from any one particular vertical zone receptacle 49 is moved on its rollers longitudinally of frame 22 as shown in the movement from the position of FIG. 1 to the position of carrier 49 shown in FIG. 15 and provides that, after the top soil is removed from the grave site the further soil and earth removed from any one zone is deposited in a different chamber, as 62. The purpose thereof is to conserve the top soil for subsequent return to the uppermost portion of the finished grave site. Accordingly, the top soil is all kept in chamber 61 for subsequent return to a zone after the zone is otherwise filled in. Inasmuch as the casket 330 being returned to the grave consumes a certain amount of volume, all the earth taken from the grave site is not returned to the grave site; however, all of the top soil is returned. Accordingly a separate compartment 61 is provided for the top soil and this apparatus 49 provides for a segregation of the material as excavated by the assembly 33 to provide that the top soil is not mixed with the other soil during the time that the grave is open. This permits all the top soil to be returned without mixture with the other earth, all of which is not returned to the site of the grave after the casket has been located therein. As shown in FIG. 16 continued downward motion of the subassembly 33 from the position shown in FIG. 15, is accomplished by a lowering of the subassembly 69 into the site 200. Generally, the site 200 may be regarded as having three portions, a foot portion 201, a center portion 202, and a head portion 203. The height of the attachment of links 113 and 114 to the shaft 66 is slightly greater than the maximum depth of the grave site so that there is no interference mechanically of the earth as 68 adjacent the grave with the arms 113 and 114.

After completion of digging of the foot portion 201 of the site 200, the hydraulic cylinder 119 is actuated and extended and the subassembly 33 thereby raised relative to the base 92 until the lower point of the auger 68 is above the ground. The digging assembly 30 is then moved on trailer 26 from the position where the subassembly 69 overlays the portion 201 of the site 200 to whereat that subassembly overlies the portion 202 of the site. Then, as shown in FIG. 17 the subassembly 33 again goes through its digging operation above described in regard to relation of FIGS. 1, 15 and 16. During this operation the auger 67 discharges the earth contacted thereby through the tube 66 outwardly of the opening 76 and onto the conveyor 37.

The above description of the digging assembly has been, for purposes of simplicity of description, directed to an orientation such as shown in FIGS. 1, 2, 15, 16 and 17 whereat the axis of tube 66 of digging assembly 33 is generally in a straight line with the mast 93 and the center of the carrier 49. Additionally, the same operations above described for FIGS. 1, 2, 15, 16 and 17 may be carried out generally as shown in FIG. 18 with the auger assembly 33 to one side of the trailer frame 172 rather than in line therewith as shown in FIG. 2. During the operation as shown in FIG. 18 with the digging occurring off to one side of the trailer, the arms 95 and 97 are locked in position by the brakes 240A–240I to hold the arms 95 and 97 in desired position relative to each other and to the longitudinal axis of the frame 172 as above described, using switches 288A, 288B and 288C.

Figure 19:
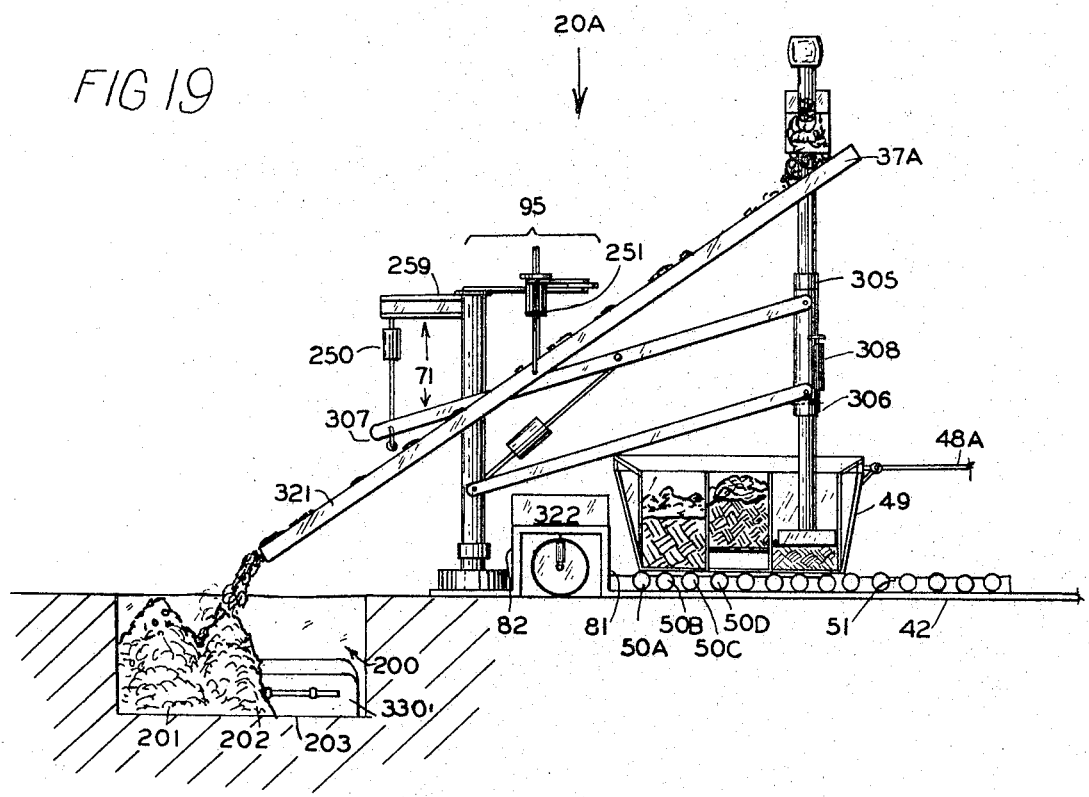
FIG. 19 is a side view, partly broken away, of the apparatus of FIG. 1 during an early stage of its operation when it is operating to close a grave, as seen along arrow 19A of FIG. 20.

After the casket has been put into the site 200 the earth is returned by the apparatus 20 to above the casket as 330 by use of the digging assembly 33. As shown in FIGS. 19 and 20 the digging assembly is first positioned in a chamber 63 previously loaded with earth. As the width and breadth of assembly 69 are only slightly smaller than those of compartments 61, 62 and 63, the vertical walls of those compartments prevent accumulation of earth on top of assembly 69 when assembly 69 is used to discharge earth from such compartments. Accordingly, the apparatus 69 readily moves downward in each chamber as 61, 62 and 63 and upward thereof as desired without interference by earth accumulating on the top thereof. The earth lifted from the chamber as 63 is discharged by auger 67 and its discharge chute thereof, 75, onto the conveyor subassembly 33 and is returned by positioning of the conveyor and/or frame 172 to the top of the casket at the foot or center or head portion thereof. Following return of an adequate amount of earth the carrier 49 is moved so that the top soil may be located above the earth previously returned above the casket. For this purpose the digging assembly 33 is raised above the top of the walls of the compartments 61, 62 or 63 of the carrier 49 and the carrier 49 moved so that top soil from chamber 61 (or any other chamber used to collect the top soil) is returned to the topmost portion of each section as 201, 202 and 203 of the grave. During this operation as seen from above, the discharge chute 75 is located, as shown in FIG. 20 so that it discharges onto the conveyor with the arms 95 and 97 arrayed to orient the discharge chute of the conveyor to the grave site. While, at FIG. 20, the grave site is shown in line with the longitudinal axis of the frame 172 the apparatus of this invention may also be used, as shown in FIG. 22 to discharge from a chamber as 61 of the carrier 49 to a grave site located at one side (or the other) of the frame 172.

While the above described embodiment 20 has in plan view a 3-foot square assembly 69, it is within the scope of this invention that other than square outlined assemblies as 69 be used and that other sizes may be used. For instance the assembly 69 may be 30 inches square, or other than square shape, by omitting rollers 130 and 132 and the cover thereabove, or by shortening the length of rollers in assembly 69.

While the standard cemetery plot is 3 feet x 8 feet, and the usual casket is 2 feet x six and one half feet inside, the above described apparatus provides for forming a 3 foot x 9 foot hole, it is clearly within the scope of those skilled in this art to first form a rectangular hole 3 feet wide and of any desired length by placing the assembly 69 successively where desired to form a grave less than 9 feet long and close it as above described.

While the figures of the drawings are not fully shown to scale, for purpose of illustrating details the following are representative dimensions:

| | Length, feet |
|---|---|
| Piston 250 | 5 |
| Mast 93 | 20 |
| Arm 111 | 30 |
| Tube 66 | 28 |
| Conveyor 37 | 40 |

Distances, pins 210 to 209—4 feet.

Chamber 61 is filled in at its sides to avoid striking of auger 67 on floor 53 by shoulders slightly higher than auger portion 68.

The mirror symmetrical array of teeth as 131 on roller 130 along the vertical center plane line of plate 70 from plates 71 to 72 provides a balanced force on tube 66 when such rollers rotate in contact with the earth. The helical arrangement of roller teeth and the auger 66 provide for a continuous, smooth nonjarring digging action.

While the conveyor 37 does not need a power source to drive material along its length because, by the apparatus above described, it is always maintained so that its discharge end 321 is lower than its feed point 37A, it is provided with solenoid shoes 381 and 382 connected by switch 379 and line 379A to battery 288, to provide for braking of the belt motion as needed. The shoes 381 and 382 are each firmly fixed to frame sides 194 and 195, respectively, and are generally identical to shoe 240A, but, in the solenoid shoes 381 and 382 the shoe spring holds the shoe away from the belt and electrical actuation of the solenoid serves to provide engagement between surface of the conveyor belt and the solenoid shoe, the shoe being firmly attached to the frame 190. The switch 379 is located at control console 322.

I claim:

1. Grave digging and filling apparatus comprising, in operative combination:
   (a) a vertical auger, a vertically elongated tube, said auger in said tube, said tube open at its bottom and discharge means attached to said tube near its top, said auger extending from below said tube and to said discharge means and drive means operatively attached to said auger,
   (b) a plurality of horizontally extending toothed rollers on each side of said auger and a frame therefor, said rollers each rotatably supported for rotation about a horizontal axis on said frame, said frame firmly attached to the bottom of said tube, drive means operatively attached to said rollers, said auger means extending below the bottoms of said rollers,
   (c) adjustable auger support means having a base spaced away from said tube, said adjustable support means attached to and extending from said base to said tube,
   (d) drive means connected to one of said toothed rollers on and extending from one side of the auger to drive said one toothed roller in one direction and drive means connected to another of said toothed rollers on and extending from the opposite side of said auger, said one of said rollers and said other of such rollers being spaced away from each other along the direction of the length of said rollers, the bottom of said one roller moving in a direction opposite to the direction of movement of the bottom of the auger portion adjacent thereto and the bottom of said other toothed roller moving in a direction opposite to the direction of movement of the auger portion adjacent thereto, and (e) a conveyor support means operatively attached to and supporting a conveyor means and supported at one end on said base, said conveyor support means comprising a series of rigid elements pivotally joined and adjustable in the horizontal plane, joints between members of said series of rigid elements, locking means for said joints operatively attached to said joints and control means operatively attached to said locking means, said control means being spaced away from said locking means and attached to said apparatus, one end of said conveyor means located adjacent and below said discharge means, upwardly opening compartmentalized receptacle means movably supported on said base, said conveyor means extending from one end below said auger discharge to another end above said upwardly opening receptacle means.

2. Apparatus as in claim 1 comprising first means sensitive to the change in vertical position of said tube and attached to said base and a second means attached to said conveyor support means and moving the said one end of said conveyor means below said auger discharge vertically by an amount equal to the change in vertical position of said tube and means operatively connecting said first and second means.

References Cited

UNITED STATES PATENTS

| | | | |
|---|---|---|---|
| 684,762 | 10/1901 | Taylor | 37—82 |
| 1,140,461 | 5/1915 | Jennings. | |
| 2,197,989 | 4/1940 | Tyler et al. | 175—91 |
| 2,494,532 | 1/1950 | Ager | 33—24 XR |
| 2,561,343 | 7/1951 | Crossley | 175—91 |
| 2,624,129 | 1/1953 | Steece | 37—95 |
| 2,632,617 | 3/1953 | Evans | 248—124 |
| 2,782,534 | 2/1957 | Wall | 37—85 |
| 3,015,175 | 1/1962 | Smith | 37—192 |
| 3,203,188 | 8/1965 | Evans | 61—72.6 |
| 3,296,716 | 1/1967 | Rezabek et al. | 37—8 |
| 3,309,875 | 3/1967 | Niederwemmer | 61—72.6 XR |

ROBERT E. PULFREY, Primary Examiner

C. D. CROWDER, Assistant Examiner

U.S. Cl. X.R.

175—91; 299—86, 7; 248—124; 37—142.5, 190; 198—104